United States Patent
Kaminow et al.

[11] 3,833,284
[45] Sept. 3, 1974

[54] COUPLING ARRANGEMENTS FOR DIELECTRIC AND METAL-CLAD OPTICAL WAVEGUIDES

[75] Inventors: Ivan Paul Kaminow, New Shrewsbury; Heinz Paul Weber, Middletown, both of N.J.

[73] Assignee: Bell Telephone Laboratories, Incorporated, Murray Hill, N.J.

[22] Filed: Aug. 27, 1973

[21] Appl. No.: 391,640

[52] U.S. Cl.......................... 350/96 WG, 350/96 C
[51] Int. Cl. .............................................. G02b 5/14
[58] Field of Search ..................... 350/96 WG, 96 C

[56] References Cited
UNITED STATES PATENTS
3,610,727  10/1971  Ulrich ........................... 350/96 WG OTHER PUBLICATIONS
Martin et al. "Formation of Light-Guiding Interconnections in an Integrated Optical Circuit by Composite Tapered-Film Coupling," Applied Optics, Vol. 12, No. 8, Aug. 1973, pp. 1909-1916.

*Primary Examiner*—John K. Corbin
*Attorney, Agent, or Firm*—Wilford L. Wisner

[57] ABSTRACT

There are disclosed arrangements for optically coupling dielectric waveguides to waveguides bounded on one or more sides by a metal layer or cladding. Excessive losses at the junctions between these guides are avoided according to the invention by disposing a tapered transition layer between the dielectric light-guiding layer and the edge of the metal layer. The tapered transition layer has an index of refraction that is less than that of the dielectric layer and a thickness such that little of the evanescent field of the light propagating in the dielectric layer extends to the leading edge of the metal layer. With tapers in the transition layer that are sufficiently gradual, transitions between the guides can be made essentially lossless.

5 Claims, 5 Drawing Figures

FIG. IA
(PRIOR ART)
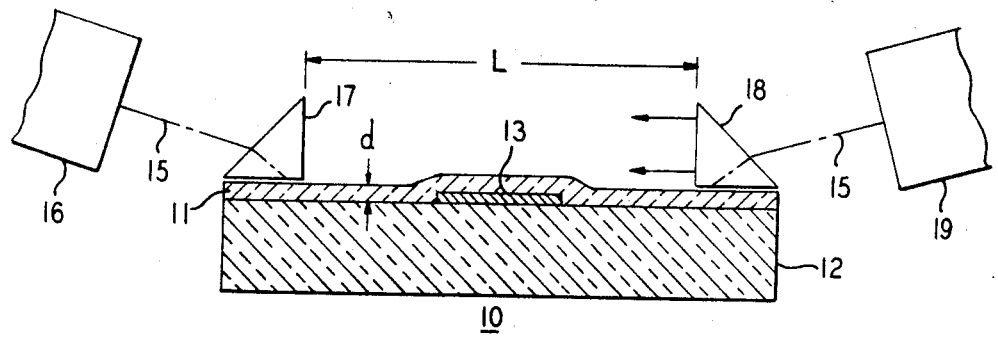
FIG. IB
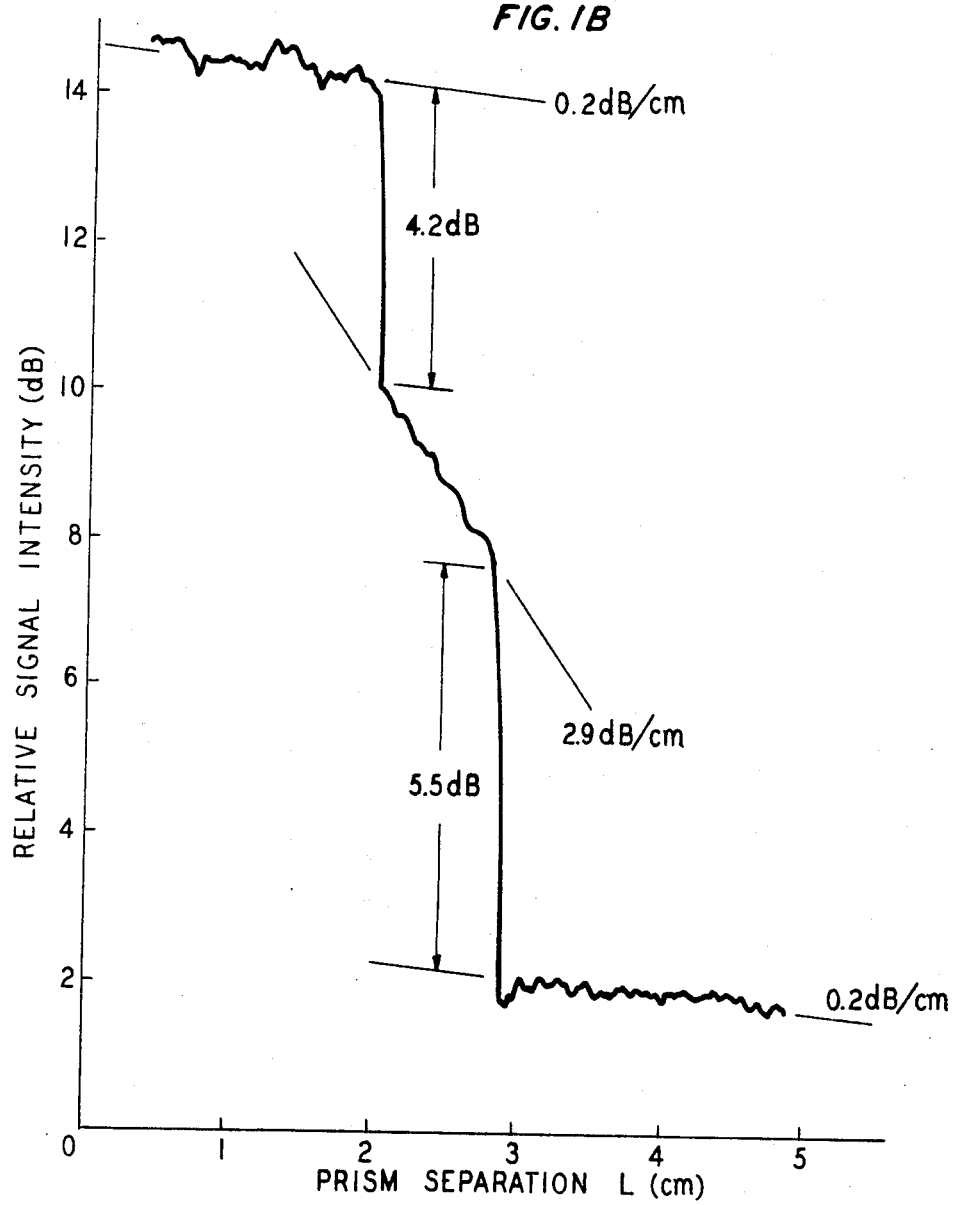

3,833,284

COUPLING ARRANGEMENTS FOR DIELECTRIC AND METAL-CLAD OPTICAL WAVEGUIDES

BACKGROUND OF THE INVENTION

This invention relates to an arrangement for efficiently coupling dielectric optical waveguides to waveguides bounded on one or more sides by a metal cladding.

Arrangements involving the propagation and manipulation of optical electromagnetic waves in miniature waveguides and circuits are now the subject of considerable research. The interest in these arrangements is based largely on the expectation that many operations in future communication, data processing, memory and other such systems will be performed reliably and economically in miniature integrated optical devices employing information-carrying guided optical waves.

The basic unit in any integrated optical arrangement is the optical waveguide, consisting of a thin dielectric film bounded by bodies of dielectric material having lower indices of refraction than that of the film. The thickness of the film is typically of the order of the wavelength of the wave to be propagated therein, so that the wave is confined within that dimension. The dielectric film may also have a lateral dimension which is small, so that the wave is confined within the two dimensions and propagates in only one.

Optical waveguides can be either passive or active devices. In the former type of guides, the dielectric film typically consists of a high quality, optically transparent material through which the optical wave propagates with low losses. Passive optical waveguides with combined losses less than one dB per centimeter are now common in the art. See, for example, Volume 10 of *Applied Optics*, pages 2395 through 2413, particularly page 2406 thereof.

In the active guides, the thin dielectric film may consist of a material which, in addition to having good optical guiding properties, is also electro-optic. An electric field applied to the film can be used to vary the guiding properties of the film and thus to manipulate the guided optical waves. A wide variety of guided wave switches, modulators and deflectors which require the application of electric fields have been proposed in the art.

In order to apply the necessary fields in the above-described active devices, thin metal layers are typically formed on one or more of the major surfaces of the dielectric film to serve as electrodes. For most such devices, it is desirable that the metal layers be formed directly on the dielectric film so that the applied field is effectively concentrated therein. As shown in Volumen 21, *Applied Physics Letters*, pages 291 through 293 (1972), a metal layer or cladding formed directly on a major surface of a dielectric waveguiding film may also serve as a polarizier or waveguide mode filter for guided optical waves.

While metal-clad optical waveguides are thus of considerable interest for a variety of active integrated optical devices, their use to date in practical experiments has been limited because of certain problems. Specifically, it can be shown that attempted transitions from unclad dielectric waveguides to waveguides bounded on one or more sides by a metal layer are characterized by substantial reflection losses and substantial waveguide mode conversion in the guided wave at the abrupt edges of the metal layer. These effects can be shown to result from a substantial mismatch of guided wavefunctions at the junctions between the guides.

SUMMARY OF THE INVENTION

We have discovered a simple arrangement for coupling between dielectric and metal-clad optical waveguides which avoids these problems.

Specifically, we have found that dielectric waveguides can be efficiently coupled to waveguides bounded on one or more sides by a metal layer by utilizing a simple tapered transition layer of a low optical loss material disposed between the dielectric waveguiding film and the edge of the metal layer. The transition layer has an index of refraction that is less than that of the dielectric film and a thickness which first gradually increases from zero and then generally decreases to zero along the direction of propagation of the guided wave in the film. The thickness of the transition layer at the leading edge of the metal layer is sufficiently large, i.e., typically about one to three wavelengths of the guided wave, so that little of the evanescent field of the wave propagating in the film extends to the leading edge of the metal layer. With tapers in the transition layer that are sufficiently gradual, i.e., extending over distances greater than about ten wavelengths of the guided wave, transitions at abrupt edges of the metal layer can be made to essentially lossless and reflectionless, with negligible waveguide mode conversion.

BRIEF DESCRIPTION OF THE DRAWING

The various features and advantages of the invention will be better appreciated from the following detailed description taken in conjunction with the accompanying drawing in which:

FIG. 1A is typical prior art dielectric optical waveguiding structure, including a region with a metal cladding, which structure is useful in explaining the invention;

FIG. 1B is typical experimental trace of propagating signal intensity vs. displacement along a guide of the type shown in FIG. 1A.

DETAILED DESCRIPTION

Figure 2:
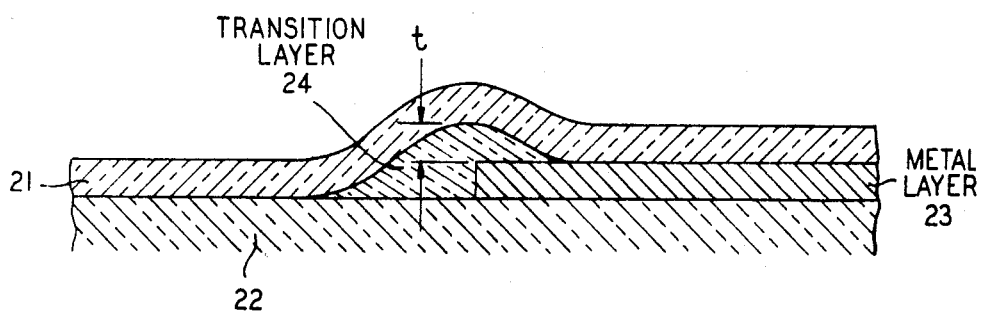
FIGS. 2 through 4 show illustrative arrangements according to the invention for coupling dielectric optical waveguides to waveguides bounded on one or more sides by a metal cladding, which arrangements avoid excessive losses at the junctions between these guides.

In FIG. 1A, there is shown a typical prior art thin-film optical waveguiding structure 10, including a region with a metal cladding 13, which structure is useful in demonstrating the problems to be avoided by the present invention. Structure 10 comprises thin dielectric light-guiding film 11, which is formed on lower refractive index dielectric substrate 12. The materials of both film 11 and substrate 12 are substantially transparent to optical electromagnetic radiation. Disposed on a region of the surface of substrate 12 forming the interface with film 11 is thin metal layer 13. As noted hereinabove, metal layer 13 may illustratively be utilized as one of two electrodes for applying an electric field to a region of film 11, or as a polarizer or waveguide mode filter for the optical wave to be guided in film 11. Other uses for metal-clad optical waveguides may be recognized by those skilled in the art. Optical beam 15 from a suitable source, such as laser 16, is coupled into a guided mode into film 11 by input prism coupler 17. Beam 15, after propagating along film 11 and over metal layer 13, is coupled out of the film by output prism coupler 18 and detected by detector 19.

More particularly, laser 16 is illustratively a helium-neon laser providing beam 15 of a wavelength $\lambda = 0.6328$ microns. Substrate 12 is illustratively a standard glass microscope slide having an index of refraction $n_g = 1.513$ at the 0.6328 micron wavelength. Layer 13 consists of a metal such as gold, aluminum, silver, etc. and may be deposited on substrate 12 by any of the well-known techniques, e.g., evaporation in a vacuum through a mask of the appropriate size. Metal layer 13 illustratively has a thickness of about 0.1 microns and is approximately 1.0 centimeter in length.

Dielectric film 11 illustratively consists of an optically transparent photoresist polymer material, such as a cinnamated copolymer of styrene and glycidyl methacrylate, which is deposited from solution over metal layer 13 and the remaining portions of the upper major surface of substrate 12. Specifically, a solution of the photoresist polymer in Kodak KPR Thinner (e.g., 10 per cent solid content by weight) is uniformly applied to the surface of substrate 12 including metal layer 13 and the thinner in the solution is then allowed to evaporate. The final thickness $d$ of the deposited film 11 can be varied by varying the original polymer concentration in the solution. Film 11 illustratively has a substantially uniform thickness $d = 2$ microns and a refractive index $n_p = 1.588$ at 0.6328 microns. The entire structure of FIG. 1A is illustratively situated in a standard air atmosphere having an index of refraction $n_a = 1.000$.

The principles of operation of input and output prism film couplers 17 and 18, respectively, are well known to those skilled in the art. See, for example, Volume 14 of *Applied Physics Letters*, page 291 (1969). Utilizing input coupler 17, it is possible to excite efficiently any single waveguide mode of beam 15 in film 11 by properly selecting the angle of incidence of beam 15 on the prism surface. Similarly, it is possible to couple substantially all of the guided light out of film 11 utilizing output coupler 18.

It is desired to measure the losses in guided beam 15 in the various regions of structure 10 of FIG. 1A, particularly at the abrupt edges of metal layer 13. To accomplish this, a technique such as that described in Volume 12 of *Applied Optics*, page 755 (1973) is used. Output prism coupler 18 is illustratively deposited on a thin layer of index matching fluid so that it can be moved along the upper major surface of film 11 toward input prism coupler 17. A particular waveguide mode of beam 15 is then coupled into film 11 by input prism 17, and the guided light is then completely coupled out of film 11 by output prism 18. Initially, the input and output prisms are spaced near the edges of film 11 on opposite sides of metal layer 13, as shown in FIG. 1A. Output prism 18 is then moved slowly toward input prism 17, an the and beam powered coupled out of film 11 by prism 18 is detected and monitored by detector 19.

A typical experimental trace of the logarithmic power coupled out of the film versus the prism separation L for a structure of the type illustrated in FIG. 1A is shown in FIG. 1B. The metal layer 13 of structure 10 corresponds to the region of the trace of FIG. 1B between approximately 2 and 3 centimeters of prism separation.

It is readily noted from FIG. 1B that relatively large losses (i.e., nearly step function drops in power) occur in guided beam 15 at the leading and trailing edges of metal layer 13. These relatively large losses occurred in all metal-clad optical waveguiding structures that were experimentally investigated. Although the losses were always several dB in size, they often differed in size at the leading and trailing edges of the metal layer, respectively, as is the case in the trace of FIG. 1B. These differences are attributed, at least in part, to nonuniform metal layer edge geometries.

The reason for the large losses at the edges of metal layer 13 in structure 10 become clear when the calculated wavefunctions for various waveguide modes of beam 15 in film 11 are investigated. Such an investigation reveals a substantial mismatch between the wavefunction for any particular mode in the unclad portion of film 11 and the wavefunction for the same mode in the portion of film 11 bounded by metal layer 13. For most waveguide modes, the evanescent field of beam 15, which extends into substrate 12 in the unclad portion of film 11, is almost totally clipped by the leading edge of metal layer 13. This mismatch of wavefunctions in the two portions of the waveguiding structure results in reflections of the beam at the metal edges, conversion of the beam into other waveguide modes and/or conversion into modes radiating out of the film. These factors account for the large losses experimentally observed in the guided beam.

Figure 3:
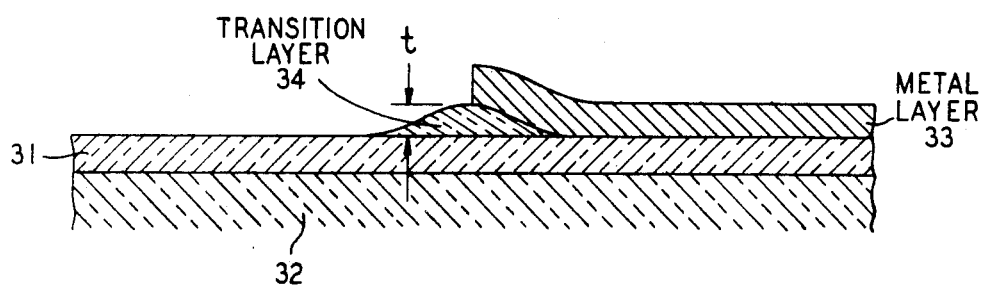
Figure 4:
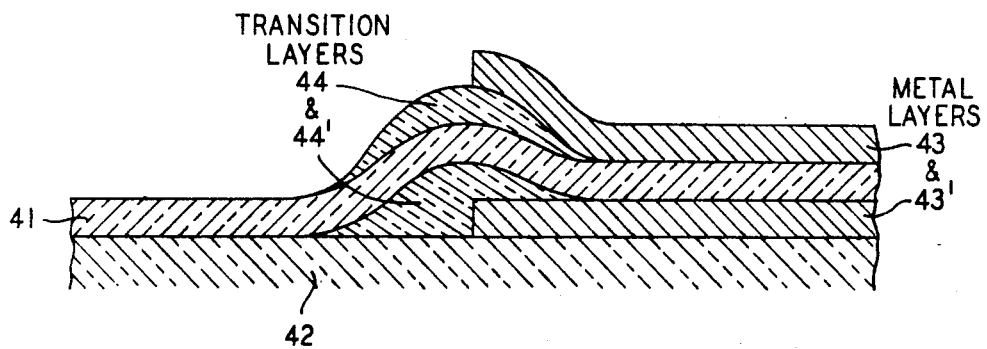

These problems can be avoided according to the present invention with the simple structures illustrated in FIGS. 2 through 4 of the drawing.

In FIG. 2, for example, there is shown a section of an optical waveguiding structure comprising thin dielectric light guiding film 21, lower refractive index dielectric substrate 22, and thin metal layer 23 formed between film 21 and substrate 22 along a portion of the structure. Illustratively, film 21 consists of the cinnamated photoresist polymer mentioned above in connection with film 11 of FIG. 1A ($n_p = 1.588$), substrate 22 is a standard glass microscope slide ($n_g = 1.513$) and metal layer 23 is formed of gold. The transverse dimension of film 21 into the plane of the drawing may vary. It can be relatively small (i.e., a few wavelengths of the guided wave) so as to confine the wave within that dimension, or it can be arbitrarily large.

It is desired in the structure of FIG. 2 to couple guided optical waves from the unclad portion of the structure (on the left) to the metal-clad portion of the structure (on the right) without excessive loss, reflection or waveguide mode conversion at the leading edge of metal layer 23. The coupling is accomplished according to our invention by disposing tapered transition layer between film 21 and the edge of metal layer 23, as shown in FIG. 2. Transition layer 24 is composed of an optically transparent dielectric material which has an index of refraction that is less than that of film 21, so that an optical wave guided in film 21 is still essentially confined therein as it passes over layer 24. Layer 24 also has a thickness which first gradually increases from zero and then gradually decreases to zero along the direction of propagation of the guided wave in film 21, with a thickness $t$ directly over the edge of metal layer 23 that is sufficiently large to avoid contact of the evanescent field of the wave propagating in film 21 with the edge of metal layer 23. The thickness tapers in layer 24 are preferably substantially linear, although they may constitute any smooth, gradual variation of thickness with film length. Tapers in layer 24 which are sufficiently gradual are those which extend over lengths in film 21 greater than about 10 wavelengths of the guided wave, and preferably greater than about 100 wavelengths of the guided wave. Layer 24 has a thickness $t$ directly over the edge of metal layer 23 that is sufficiently large, typically when $t$ is about one to three wavelengths of the guided wave, since the evanescent field of the guided wave is typically negligible at such distances from the film surface.

Generally, the closer in value one chooses the respective refractive indices of film 21 and transition layer 24, the farther the evanescent field of the guided wave extends from the film surface and the larger the thickness $t$ of layer 24 must be to avoid contact of the evanescent field with the edge of metal layer 23. Thus, the thickness $t$ selected for layer 24 in any particular arrangement would depend upon the materials used for film 21 and layer 24, as well as on the amount of loss tolerable in the arrangement.

Amorphous materials, such as optical glasses or polymeric compositions, are preferred for transition layer 24, since they are generally simple to fabricate into high optical quality layers with the desired tapers. A variety of techniques for fabricating transition layer 24 will be recognized by those skilled in the art. For example, where layer 24 consists of an optical polymer, such as poly(cyclohexyl methacrylate) ($n = 1.505$) or poly(methyl methacrylate) ($n = 1.490$), the RF discharge plasma polymerization process described by M. J. Vasile and G. Smolinsky in Volume 11 of *Applied Optics*, page 637 (1972) would be a suitable technique. With this technique, the tapered edges of layer 24 can be formed naturally by depositing the layer material through a mask of a selected thickness (e.g., two opposed metal plates) positioned to expose the edge of metal layer 23 and a portion of substrate 22. The tapers produced with this technique are roughly linear and extend over distances roughly proportional to the thickness of the mask, up to a few millimeters. Relatively long tapers in layer 24 can be provided with this technique using a mask which is set slightly above the surface of substrate 22 and metal layer 23 or by using a mask, the bottom surface of which is undercut to produce a cantilever edge. Two standard razor blades spaced apart with their sharpened edges facing each other are suitable for this purpose. Tapers extending over distances up to about 5 millimeters can be produced in this way. Tapered layers of optical glasses, such as Corning 7059 glass, can also be fabricated by sputtering the layer material through such masks. See Volume 48 of the *Bell System Technical Journal*, page 3445 (1969).

With transition layer 24, a beam of optical wave energy guided in film 21 of FIG. 2 passes over the leading edge of metal layer 23 with negligible loss or reflection. Additionally, theoretical analyses confirm that, with a tapered layer of the type specified hereinabove, the guided wave transitions from the unclad portion of film 21 to the metal-clad portion thereof are essentially lossless and reflectionless, with negligible waveguide mode conversion.

Guided wave transitions in the opposite direction, that is, from the meta-clad portion of film 21 to the unclad portion thereof (i.e., from right to left in the figure), are likewise essentially lossless as a result of the use of transition layer 24.

FIG. 3 of the drawing illustrates the positioning of the tapered transition layer of our invention for structures in which the metal layer is formed on the upper major surface of the guiding film rather than between the guiding film and the substrate. The guiding structure of FIG. 3 comprises thin dielectric light-guiding film 31, lower refractive index dielectric substrate 32 and metal layer 33 formed on a portion of the upper surface of film 31. To provide the desired lossless transition from the unclad portion of film 31 to the portion thereof bounded by metal layer 33, or vice versa, transition layer 34 is disposed between film 31 and the edge of metal layer 33, as shown in FIG. 3. Transition layer 34, like layer 24 of FIG. 2, has a refractive index less than that of film 31 and a thickness which is gradually tapered up from zero and then down to zero along the direction of the guided wave propagating in film 31. The thickness $t$ of layer 34 is agains such that little of the evanescent field of the wave guided in film 31 extends to the leading edge of metal layer 33. Tapers extending over lengths greater than 10 wavelengths of the guided wave and a thickness $t$ of about one to three wavelengths of the guided wave are again specifically incorporated into layer 34. It will be noted that the total maximum thickness of layer 34 of FIG. 3 is less than the total maximum thickness of layer 24 of FIG. 2, typically by an amount equal to the thickness of lower metal layer 23.

For coupling to and from dielectric optical waveguides bounded on both major surfaces by metal layers, the simple structure illustrated in FIG. 4 of the drawing can be used. Excessive losses for an optical beam guided in thin dielectric film 41 at the abrupt edges of upper metal layer 43 and lower metal layer 43' are avoided by tapered transition layers 44 and 44', respectively. Tapered transition layer 44 is identical to layer 34 of FIG. 3, while tapered transition layer 44' is identical to layer 24 of FIG. 2. Both layers 44 and 44' can be fabricated of the materials and by the techniques specified hereinabove with respect to layer 24.

We claim:

1. An optical coupling arrangement of the type comprising a substrate, an optically transparent dielectric thin film formed on a major surface of said substrate to guide a beam of optical electromagnetic radiation, and a metal layer formed on at least one of the major surfaces of said film along a portion of the intended path of the beam to be guided therein, said arrangement being characterized in that a transition layer of an optically transparent material is disposed between said film and said metal layer in the region of an edge of said metal layer, said transition layer having an index of refraction less than that of said film and a thickness which is first gradually increased preceding the edge and then gradually decreased following the edge along the intended path of the beam with a thickness at the edge of said metal layer sufficient to avoid contact of the evanescent field of the beam to be guided in said film with the edge of said metal layer.

2. The arrangement of claim 1 in which said film has a thickness of the order of the wavelength of the radiation to be guided therein and in which the tapered regions of said transition layer extend over distances along the intended path of said beam greater than about ten times the wavelength.

3. The arrangement of claim 2 in which the thickness of said transition layer at the edge of said metal layer is between about one and three times the wavelength of the beam to be guided in said film.

4. The arrangement of claim 1 in which the transition layer thickness is zero at a first point following the edge of said metal layer along the intended path of said beam.

5. The arrangement of claim 4 in which the transition layer thickness is zero at a second point preceding the edge of said metal layer along the intended path of said beam.

* * * * *